Figure 1:
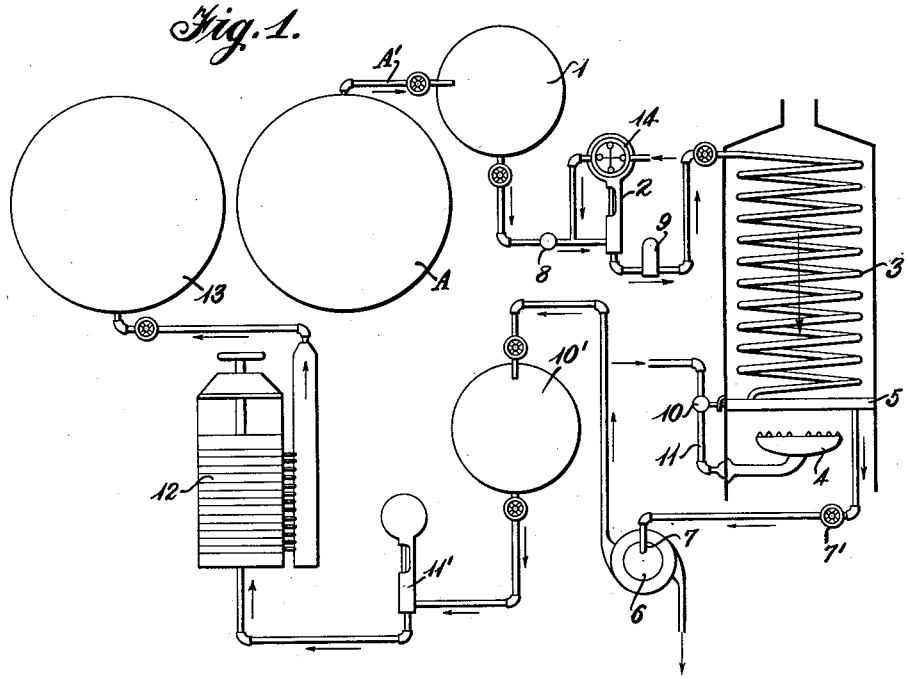

April 29, 1941.　　B. CLAYTON ET AL　　2,239,701
PROCESS FOR REFINING OILS
Filed May 31, 1938

Inventors
Benjamin Clayton
Walter B. Kerrick
Henry M. Stadt
By Harris, Kiech, Foster & Harris
Attorneys Patented Apr. 29, 1941

2,239,701

UNITED STATES PATENT OFFICE 2,239,701

PROCESS FOR REFINING OILS

Benjamin Clayton, Houston, Tex., and Walter B. Kerrick, Los Angeles, and Henry M. Stadt, Glendale, Calif., assignors to Refining, Inc., Reno, Nev., a corporation of Nevada Application May 31, 1938, Serial No. 211,056

6 Claims. (Cl. 260—425)

This invention relates to an improved process for refining oils, and more particularly vegetable, animal, and certain other oils capable of separation and refining.

The principal object of the invention is to reduce the time period in the separation of the various constituents of oils, such as the "foots" from cottonseed and similar oils.

Another object is to more completely recover the more valuable constituents.

Another object is to promote the maximal separation by the addition of the minimal quantity of chemical reagents.

Another object is to minimize the conversion or transformation of the natural constituents of the oil by prolonged internal reactions.

Another object is to conserve all of the colloidal values in the oil in removing the solids therefrom.

Another object is to preserve and clarify the natural colors, flavors, odors, and other values desirable in commercial oil cuts or separations.

Another object is to avoid oxidation, fermentation, decomposition and other natural reactions incidental to the prolonged and involved processes heretofore practiced in this art.

Another object is to isolate and remove certain constituents present in some edible oils, such as the red coloring matter in cottonseed oil.

The above and other valuable results are largely due to the fact that expressed seed oils can be taken immediately from the press and the whole process of refining completed in a few minutes, before chemical reactions and decompositions set in; in contradistinction to prior practices requiring longer periods of hours or even days, in some instances.

Other objects and advantages will appear as the description progresses.

In this specification and the accompanying diagram the invention is disclosed in its preferred form. It is to be understood, however, that it is not limited to this form because it may be practiced in other forms within the purview of the claims following the description.

The following disclosure will relate particularly to the treatment of expressed cottonseed oil, which teaching will guide those skilled in the art in treating other substances, without departing from the spirit of the invention.

The whole oil as it comes from the press contains hulls, linters, nitrogenous non-fatty materials such as gums, and the like. The soluble gums, albuminous and other impurities are not truly water solvent, but they imbibe or absorb water and swell, forming a glutinous sludge in the separator.

A desirable solution consists of about twelve percent (12%) of caustic soda in water, of which about one percent to two percent (1% to 2%) is added to the oil by volume for California cottonseed oil.

Figure 2:
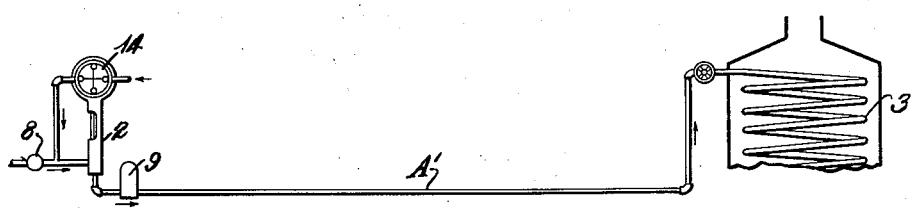

Figure 1 of the drawing diagrammatically shows a schematic apparatus useful in the practice of this invention, wherein the whole oil is pumped from the drip tank A, through the pipe A' to the mixing tank 1 and Fig. 2 is a fragmentary view similar to Fig. 1 showing an apparatus suitable for carrying on a modified process.

In the first step the reagent, such as alkali in solution, is mixed with the oil in the tank 1, from whence it is pumped into the descending coils 3 by the pump 2 in step two. These coils are properly enclosed above the burner 4. From the coils the oil passes through the thermostatic unit 5, after which it is jetted into the centrifuge 6, through the calibrated nozzle 7 in step three. The valve 7' is introduced into the flow line to manually regulate the amount of back pressure in the coils 3.

The back pressure at the nozzle reacts in the coils against the check valve 8 at the pump, to maintain the predetermined pressure on the oil.

If a pulsating pump is used at 2, it is advisable to insert the air chamber 9 in the line to absorb the pulsations.

The oil passing through the thermostatic unit 5, controls the heat generated at 4, by controlling the throttle valve 10 controlling the fuel passing through the pipe 11, to the burner 4.

In this connection attention is directed to the copending applications in the name of Walter B. Kerrick, filed November 14, 1930, Serial No. 495,636, entitled: Fluid heater; and Method of treating liquids, Serial No. 495,634. These applications relate to the means and the method of treating colloids in the presence of alkali to accomplish a high state of hydrolysis.

In the practice of the present process it is important that in the coils 3 the oil and alkali be maintained in as constant volume or body as may be. That is, there should be no formation of vapors, foaming, or sudden or uneven expansion of the mixture within the apparatus.

It is advisable, therefore, to thus treat the oil by a continuous process in small active quantities rather than to attempt such fine degrees of regulation in larger "batches."

To that end it is important to calibrate the capacity of the discharge orifice of the nozzle 7, with respect to the measured input of the pump 2, so that the static pressure and constant volume may be maintained in the coils 3, while the dynamic pressure is increased by the application of heat.

It is desirable in the second step that the solution flow downwardly toward the source of heat so that the temperature of the solution progressively rises toward the discharge 7 from the heater.

It is important that the volume of heat be automatically regulated by the temperature of the solution. The maintained temperature of the oil can be manually or thermostatically controlled at 5.

There should be maintained coordination between the constant volume of input, output and the volume of heat applied to maintain the desired pressure in the coils 3. This will establish the proper velocity and turbulence of the oil within the coils, to insure the finest division of the alkali and diffusion of the alkaline solution within the oil. This is assisted by the progressively rising dynamic pressure, due to the thermal expansion of the oil, which causes an increased interstitial penetration and improved distribution of the alkali. Every molecule or globule of oil is acted upon by the solution and the inter reactions are complete, as proved in the resultant product.

In the present invention the quantity of alkali is so minute that saponification is greatly reduced and the free oil is not attacked by the alkali.

The third step is completed by jetting the atomized oil mixture into the centrifuge 6, at atmospheric pressure, with an instant drop in temperature. Centrifuging this hydrolized oil from the heater removes the "foots" or "soap stock" resulting from the alkali treatment accomplished in the coils.

The fourth step consists of clarifying and bleaching the processed oil in the agitating tank 10', by the addition of clays or in any other conventional manner.

The fifth step is to pump the clarified oil by means of the pump 11', through the conventional filter press 12. The filtered oil drains from the filter press into the tank 13. The ultimate edible product is a clear, pure, light colored stock, practically free from the deleterious red color, with the natural flavor preserved.

In some of the methods heretofore practiced the whole oil is agitated at high temperature (145° F.) open to the atmosphere, for long periods, about 45 minutes, in the presence of an excess of alkali; then it often stands for days to permit separation by precipitation. The oil and soap stock are so long in contact during the settling of the oils, that decomposition sets in and new free fatty acids formed, defeating the purpose intended. The agitation also causes undesirable emulsification.

In the present instance the small quantity of alkali leaves scarcely a trace in the ultimate product, which is at no time subjected to a temperature greater than 100° F. at about 100 pounds pressure. The few minutes required to complete the process avoids decomposition, rancidity, or any deleterious inter reactions. The oil is completely dehydrated by step three, which reduces the catalytic-like effect in the deterioration of the oils, disfavors the production of free fatty acids which give rise to rancid flavors, odors and the accompanying bacterial reactions.

The present process can be simplified and speeded up by accomplishing step one by injecting the alkali or alkaline solution into the flowing stream of oil from the tank A. This is done by introducing the reagent meter 14 into the oil line a'. If it is installed at the pump 2 as shown, it can be geared thereto and the quantity of alkali solution synchronized with the quantity of oil measured by the pump 2. It is obvious, however, if, as shown in Fig. 2, the alkali is introduced closer to the oil supply A, which may be remote from the heater 3, premixing with the oil will take place in the pipe A' before reaching the heater 3 and step two.

In this shorter process the "foots" and other heavier constituents comprising the whole oil are put through "step two" in the heater 3 without oxidation or atmospheric reactions. The nozzle 7 is discharged into the centrifuge to accomplish "step three." Thus, the modified process is truly continuous from the extractor at A to the centrifuge 12.

The reagent thus pumped into the line A' in measured quantity, enters the oil in filamentary form and performs its previously described reactions during step two. The ultimate result is the same in both instances. The particular advantage of the shorter process is that the whole separation can be accomplished in a few minutes after the oil leaves the seeds in the conventional pressing or extracting operation, as at the drip tank A. There may be certain oils, however, that are more adaptable to the shorter process.

The shorter process has the added advantage that the latent heat, acquired in the pressing and extracting operations, facilitates the rise in temperature transferred in the heater 3. This is a desirable economy and is superior to reheating the raw oil after it has chilled. Another advantage of the shorter process, which is carried on under plus pressure, is that the separated oil emerges from the heater 3, thoroughly sterilized.

The foots, etc., removed by centrifuge in step three show practically no free oil and are more easily divided into their constituent gums, resins and inert suspended matter, than when the whole oil is treated by any other process heretofore practiced, so far as we are aware.

It is to be taken into consideration that certain substances having alkaline reactions can be treated by this process with an acid reagent. It is also a fact that in occasional instances refining separations can be accomplished without any reagents.

The exact procedure and reagents consistent in the practice of this invention can be varied to process various oils, depending upon their natures and the form of ultimate product desired, without departing from the spirit of the invention.

From the above, it will appear that our process involves the mixing of proportioned quantities of the oil to be refined and a reagent of the type set forth which is capable of combining with impurities in the oil to form soap stock. Thereafter, the soap stock is separated from the neutral oil. If centrifugal separation is employed, it is found that practically all the impurities are separated from the oil while therein but, in some cases, the subsequent equipment, including the filter press, may be used to remove the last traces of impurities from the oil.

It is desirable that the mixture of oil and soap stock be conditioned for this separation by the presence of a temperature facilitating this separation and by the maintenance of the soap stock uniformly distributed in the oil so that the mixture reaching the separator, a centrifuge in the hereinbefore example, will be uniform from time to time. It is known that, when such an oil and refining reagent are mixed in batches, an emulsion will form and that heat will assist in breaking this emulsion preparatory to separation. In the present invention, this phenomena may be adapted to a continuous process in which the mixing is effected in a brief period and in which the reagent is in contact with the oil for such a brief period as to minimize saponification of the neutral oil, and this conditioning will desirably involve the presence of an emulsion-breaking temperature at the time of separation. When operating on those California cottonseed oils mentioned in the examples hereinbefore set forth, we have found it unnecessary to use temperatures in excess of 100° F. The elongated passage formed by the pipe of the heater 3 is very valuable in producing these and other conditioning effects.

If the reagent meter 14 is geared to the pump 2, as above-described, the reagent will be introduced into a stream of the oil at a rate proportional to the amount of oil pumped so that definite proportions of the oil and reagent are mixed. The proportion of such reagent needed to neutralize the fatty acid and complete the refining of the oil can be readily determined by any chemist skilled in the refining of such oils, or can be determined by trial. It is not desirable to use reagent in quantities much in excess of those necessary to refine the oil, thereby avoiding unnecessary action of the reagent on the oil itself.

The present application is directed to the modification disclosed in Fig. 1 in which a receptacle 1 is provided for receiving a mixture of alkaline reagent and vegetable oils. In this specie, the emulsion resulting from the mixture is retained in the tank 1 but is continuously withdrawn therefrom and subjected to an emulsion breaking temperature in its passage through the heating zone in order that the mixture when delivered to the centrifugal 6 will be conditioned for centrifugal separation. Desirably the temperature to which the emulsion is subjected will not be in excess of that required to break the same. For high grade oils this temperature need not substantially exceed 100° to 120° F. The emulsion is of the type in which the water is the dispersed phase and the oil is in a continuous phase, which is known as a water in oil type of emulsion. The heat applied is sufficient to change the character of the emulsion in order that the particles of foots may agglomerate. The temperature also lowers the viscosity of the oil to a point where the centrifugal works efficiently. The particular form of the invention may be deemed as semicontinuous and in certain instances may be desirable where sufficient contacting time between the alkali and oil is advisable while the mixture remains in the receptacle 1, for the reduction of color or for conditioning the mixture for subsequent treatment or separation.

The present application relates to our co-pending cases, Serial No. 182,124, filed December 28, 1937, and Serial No. 172,622, filed November 3, 1937, which were co-pending with our earlier application Serial No. 534,533, filed May 2, 1931, now Patent No. 2,100,274, dated November 23, 1937.

We claim:
1. A process for refining animal and vegetable oils which comprises the steps of: mixing in a relatively large vessel and at a relatively low temperature a refining reagent with said oils, in a concentration sufficient to react with impurities contained therein and to form foots, conditioning the mixture for centrifugal separation by elevating the temperature thereof, continuously pumping a relatively small stream of the thus conditioned mixture to a centrifugal separator through a conduit of restricted cross sectional dimensions whereby to maintain the foots in an even state of dispersion while maintaining a state of agitation such as will permit agglomeration and centrifugally separating the agglomerated foots from the oil.

2. A process of refining animal and vegetable oils which comprises the steps of: mixing a refining reagent with said oils in a concentration sufficient to react with impurities contained therein and to form foots, permitting the mixture to remain in a relatively large vessel for a relatively long period of time, rapidly pumping a relatively small stream of said mixture from said relatively large receptacle through a conduit of restricted cross sectional dimensions, maintaining the mixture in a state of movement during said advancement of the stream to prevent substantial stratification thereof while providing sufficient time for agglomeration of the foots and centrifugally separating the thus agglomerated foots from the oil with the aid of sufficient temperature to facilitate such separation.

3. A process for refining animal and vegetable oils which comprises the steps of: mixing a refining reagent with said oils in a concentration sufficient to react with impurities contained therein and to form foots, permitting a relatively large quantity of the mixture to remain in a relatively large receptacle until the reaction has been substantially completed, while avoiding such agitation in the receptacle as would interfere with centrifugal separation of the resulting foots, continuously and rapidly pumping a small stream of the mixture through a conduit constituting an agglomerator, while maintaining a rate of movement sufficient to permit agglomeration, while preventing stratification of said foots, continuously introducing the agglomerated mixture to a centrifugal separator and there quickly separating the foots with the aid of heat sufficient to facilitate such separation.

4. In the art of purifying animal and vegetable oils by admixing an alkaline refining reagent therewith in a concentration sufficient to neutralize the free fatty acids and to form foots, the improvement which comprises: admixing a refining reagent with the oils in a relatively large vessel whereby to provide time for substantially complete neutralization of the free fatty acids and the precipitation of other impurities, rapidly pumping a small stream of said mixture from said receptacle through a conduit of restricted cross sectional dimensions at a rate of movement to permit agglomeration of the foots and other impurities while preventing stratification of the foots in the conduit and promptly centrifugally separating the thus agglomerated impurities from the refined oil with the aid of sufficient temperature to facilitate such separation.

5. In the art of purifying animal and vegetable oils containing free fatty acids and color impurities wherein an alkaline refining reagent is admixed with said oils in a concentration sufficient to precipitate the impurities contained therein in the form of foots, the improvement which comprises: permitting the mixture to remain in a relatively large receptacle until the reaction has been substantially completed while avoiding such turbulence in the receptacle as would form an inseparable mixture, thereafter continuously advancing a relatively small stream of the mixture through a conduit of restricted cross sectional dimensions while providing sufficient time for agglomeration of the foots and other impurities and promptly centrifugally separating the agglomerated foots from the neutral oil with the aid of temperature sufficient to facilitate such separation.

6. The process as defined in claim 5 in which the remaining residual impurities, following centrifugation, are promptly and continuously removed from the neutral oil.

BENJAMIN CLAYTON.
WALTER B. KERRICK.
HENRY M. STADT.